United States Patent [19]
Miller et al.

[11] Patent Number: 5,494,989
[45] Date of Patent: Feb. 27, 1996

[54] ACETYLENIC COPOLYMERS AND MEMBRANES THEREOF

[75] Inventors: Warren K. Miller; Dwayne T. Friesen, both of Bend, Oreg.

[73] Assignee: Bend Research, Inc., Bend, Oreg.

[21] Appl. No.: 248,236

[22] Filed: May 24, 1994

[51] Int. Cl.$^6$ .................. C08F 238/02; C08F 230/08; B01D 71/06
[52] U.S. Cl. .............. 526/285; 210/500.21; 210/500.27; 526/279
[58] Field of Search .................... 526/279, 285; 210/500.21, 500.27

[56] References Cited

U.S. PATENT DOCUMENTS

| | | | |
|---|---|---|---|
| 4,567,245 | 1/1986 | Takamizawa | 526/279 |
| 4,657,564 | 4/1987 | Lansam | 55/16 |
| 4,778,868 | 10/1988 | Higashimura | 526/279 |
| 4,808,679 | 2/1989 | Langsam | 526/126 |

FOREIGN PATENT DOCUMENTS

34048/93  5/1993  Japan .

OTHER PUBLICATIONS

T. Hamano et al., J. Pol. Sci. Parta, Pol. Chem. (1988) 26, 2603–2612.
T. Masuda, et al., Polymer (1988) 29, 2041–2049.
29 Polymer 2041 (1188)—Masuda et al. (1988).
26 J. Appl. Polym. Sci.: Part A: Polymer Chem. 2603 (1983)—Hamano et al.

Primary Examiner—Fred Zitomer
Attorney, Agent, or Firm—Chernoff, Vilhauer, McClung & Stenzel

[57] ABSTRACT

Acetylenic copolymers especially suitable for fabrication of gas and vapor separation membranes are disclosed.

7 Claims, No Drawings

ACETYLENIC COPOLYMERS AND MEMBRANES THEREOF

The government has nonexclusive rights in this invention pursuant to Grant No. III-9260408 awarded by the National Science Foundation.

BACKGROUND OF THE INVENTION

Substituted polyacetylenes are known, and although they have many possible uses, they are of particular interest for use in the fabrication of membranes for gas and vapor separations. Substituted polyacetylenes are particularly noted for their high gas permeabilities. In fact, the oxygen permeability of the substituted homopolymeric polyacetylene poly(1-trimethylsilyl)propyne [PTMSP], is the highest of any known polymer. Masuda et al., 105 JACS 7473 (1983). Although polyacetylenes substituted by bulky groups such as trimethylsilyl have extremely high permeability, their utility as membrane materials has been limited by their relatively low selectivities. For example, the selectivity of PTMSP toward oxygen over nitrogen ($\alpha O_2/N_2$) is only 1.7 (a minimum oxygen to nitrogen selectivity of 4 is generally considered necessary to be commercially useful).

A few substituted homopolymeric polyacetylenes have been reported to have somewhat higher selectivities. For example, Masuda et al., in 29 Polymer 2041 (1988), report several aryl-substituted polyacetylenes with moderate oxygen to nitrogen selectivities. These include: poly(1-phenylpropyne) ($\alpha O_2/N_2$=2.7); poly(1-phenyloctyne) ($\alpha O_2/N_2$=2.5); poly (1-chloro-2-phenylacetylene) ($\alpha O_2/N_2$=2.7); and poly(3-propyl, 3-(dimethyphenylsilyl)propyne) ($\alpha O_2/N_2$=3.8). However, the last-mentioned substituted polyacetylene has an oxygen permeability of less than 10 Barrers.

What has been needed are substituted polyacetylenes that have both moderate to high oxygen to nitrogen selectivity ($\geq 4$) and high oxygen permeability ($\geq 20$ Barrers). One unsuccessful approach to achieving such a combination of properties in a single polymer is reported by Hamano et al., in 26 J. Appl. Polym. Sci.: Part A: Polymer Chemistry 2603 (1988), wherein the copolymerization of 1-phenylpropyne with 1-trimethylsilylpropyne [TMSP] is reported. Five polymers are reported having varying contents of trimethylsilyl repeat groups and the following permeabilities and selectivities:

0% TMSP: $P_{O2}$=10 Barrer; $\alpha_{O2/N2}$=3.0
25% TMSP: $P_{O2}$=40 Barrer; $\alpha_{O2/N2}$=2.8
50% TMSP: $P_{O2}$=400 Barrer; $\alpha_{O2/N2}$=2.3
75% TMSP: $P_{O2}$=1700 Barrer; $\alpha_{O2/N2}$=2.0
100% TMSP: $P_{O2}$=6000 Barrer; $\alpha_{O2/N2}$=1.7

There is therefore still a need in the art for a class of acetylenic polymers possessing both reasonably high selectivities and high permeabilities. This need is filled by the present invention, which is summarized and described in detail below.

SUMMARY OF THE INVENTION

The invention comprises a novel class of acetylenic copolymers that have an unusual combination of high gas permeability and high gas selectivity that makes the copolymers ideal materials for fabrication of membranes for use in the separation of gases and vapors, and in particular for the separation of oxygen and nitrogen from air and the separation of carbon dioxide from other gases.

DETAILED DESCRIPTION OF INVENTION

According to the present invention there are provided copolymers of an aryl-substituted acetylene monomer and a bulky group-substituted monomer having unexpectedly advantageous permeability properties and that therefore are ideally suited to the fabrication of gas and vapor separation membranes. These copolymers generally consist of the copolymeric product of (1) an aryl-substituted acetylenic monomer of the structure

where A is selected from phenyl and substituted phenyl, and R is selected from —$CH_2CH_3$,—$CH(CH_3)_2$, and —$CH_2CH_2CH_3$, and (2) a bulky group-substituted acetylenic monomer of the structure

where B is Si(R')$_3$, and R' is alkyl having 1 to 3 carbon atoms

A particularly desirable polymeric material is the product obtained by copolymerizing:

 (1)

where A is phenyl, and R is $CH_2$—$CH_3$, and (2) 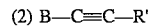 (2)

where B is Si($CH_3$)$_3$, and R' is —$CH_3$ or —$C_2H_5$.

A specifically preferred example of such polymers are the copolymers of 1-phenyl butyne (PB) and either:

(a) 1-(trimethylsilyl)propyne, or
(b) 1-(trimethylsilyl)butyne.

Such copolymers generally consist of at least 20 wt % of the aryl-substituted repeat unit and at least 5 wt % of the bulky group-substituted repeat unit. (By "wt %" is meant weight of repeat unit divided by the total weight of polymer.) The copolymer has the general structure

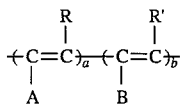

where (a/a+b)$\geq$0.2 and (b/a+b)$\geq$0.05, and it may be in the form of a block copolymer, a copolymer having random repeat units, or a copolymer that is a combination of these two extremes.

Such copolymers are generally synthesized in a single reaction step wherein each monomer is dissolved in a common solvent along with an appropriate catalyst and cocatalyst. Monomers are generally added in approximately the weight ratio desired in the copolymer product. However, the more reactive monomer is usually incorporated to a greater degree into the copolymer structure. Thus, for example, when equal amounts of each repeat unit are desired in the product copolymer, a somewhat larger amount of the less reactive monomer relative to the more reactive monomer (e.g., in a 55:45 ratio) is added to the reaction mixture. Although a variety of solvents can be used, the solvent must generally not react with the catalyst or cocatalyst but still dissolve both acetylenic monomers. Thus, typical solvents are aromatic hydrocarbons and halogenated hydrocarbons. Specifically, benzene, toluene, xylene, dichloroethylene, and methylenechloride are preferred solvents.

A variety of catalysts and cocatalysts can be used to carry out copolymerization of the acetylenic monomers of the present invention. Catalysts include tungsten hexachloride ($WCl_6$), molybdenum pentachloride ($MoCl_5$), molybdenum oxytetrachloride ($MoOCl_4$), niobium pentachloride ($NbCl_5$), and tantalum pentachloride ($TaCl_5$). Of these, the latter three are preferred and $TaCl_5$ is most preferred. Normally, a cocatalyst is added to the polymerization mixture along with the catalyst. Cocatalysts that can be used include tetrabutyl tin (TBT), tetraphenyl tin (TPT), and triphenyl bismuth (TPB). Of these, TPB is preferred.

The total concentration of monomers in the reaction mixture usually ranges from 0.05M to 3.0M and the concentrations of catalyst and cocatalyst usually range from 0.1% to 3% and 0.2% to 5%, respectively, of that of the monomers. Preferred concentrations are: monomers, 0.1 to 0.3M; catalyst, 0.005 to 0.01M; and cocatalyst 0.005 to 0.01M. The reaction is usually carried out at a temperature of 50° to 120° C. and preferably at 70° to 90° C. over a period of 1 to 24 hours and preferably 3 to 6 hours.

After the reaction is complete, it is quenched by addition of more solvent and alcohol, preferably methanol. A small amount of water can be added along with the methanol to facilitate removal of the catalyst by precipitation and filtration.

Impurities, particularly the cyclic trimers of the monomers, are removed from the copolymer by adding acetone to the copolymer mixture. This causes the polyacetylene copolymer to precipitate while the impurities and oligomers remain in solution. The copolymer is collected by filtration and washing with an appropriate solvent such as acetone. The polymer may be further purified by dissolution in an appropriate solvent (such as toluene or tetrahydrofuran) and precipitation again by addition of acetone.

Membranes fabricated from the novel copolymers of this invention generally fall into three classes: dense films, skinned asymmetric, and composite. Dense films are generally sheets of dense polymer 1 to 100 μm thick. They are preferably formed by dissolution of the copolymer in a volatile solvent forming a solution that is then cast onto a flat surface using a doctor blade. The dense film forms upon evaporation of the solvent. Skinned asymmetric membranes generally consist entirely of the novel copolymer. They are preferably fabricated by a solution casting or spinning process wherein a solution of the copolymer is extruded in the form of either a flat sheet or hollow fiber. Solvent is removed and polymer is solidified by either contact with a nonsolvent, evaporation of solvent, or a combination of both. The copolymer membrane made in this manner has an asymmetric pore structure in that there is a thin layer of dense (i.e., nonporous) copolymer supported by a relatively thick porous layer. Thus, although the overall thickness of the membrane is typically 20 to 200 μm, the effective thickness for selective permeation is typically only 0.04 to 1.0 μm. Formation of skinned asymmetric membranes is described in detail by Kesting in "Synthetic Polymeric Membranes: A Structural Perspective" (2d Ed 1985).

Composite membranes may be formed by coating the novel copolymers of the present invention on a suitable support. Generally the support consists of a thick yet highly permeable polymer that acts to support the selective coating. Such supports are preferably microporous polymers in the form of flat sheets, hollow fibers or tubes. The supports, however, may also be porous ceramics, polymer or ceramic fabrics, sintered metal or metal mesh, or porous glass. The novel copolymer coating may be applied to either one or both surfaces of the flat or tubular supports. The copolymer coating should be sufficiently thin and the support sufficiently permeable that the composite membrane has permeability properties substantially the same as that of the copolymer film.

Once formed, the membranes may be annealed by heating under vacuum either in air or an inert atmosphere such as nitrogen or argon, for 1 to 50 hours at a temperature of 50° to 200° C. Solvent vapor may also be present during the annealing process. Preferred annealing procedures involve heat-treating the membranes in an argon atmosphere for 15 to 20 hours at 70° to 100° C.

Membranes can be utilized to separate gas or vapor mixtures by sealing the membrane in a permeation cell, plate-and-frame module, spiral-wound module or hollow fiber module in a manner so that the two sides of the membrane are separate from each other. A gas or vapor feed mixture is contacted with the feed side of the membrane, a volatile retentate stream is withdrawn from the feed side of the membrane, and a permeate stream is withdrawn from the opposite side of the membrane. Generally, permeation of gases or vapors across the membrane is driven by maintaining the feed stream pressure at a value greater than that of the permeate stream.

Separations that can be conducted using membranes formed from the novel copolymers of the present invention include separation of oxygen or nitrogen from air; removal of $CO_2$ or $H_2S$ from natural gas; removal of volatile organic vapors such as benzene, toluene, and methylene chloride from gas streams such as air or argon; separation of aromatic vapors such as benzene, toluene or xylene from aliphatic vapors; separation of water vapor or liquid water or polar organic vapors such as ethanol or acetone from other fluids.

The permeability properties of the copolymers of the present invention are surprisingly good. For example, the gas permeability of nonannealed dense film membranes composed of a polyacetylene copolymer consisting of 13 wt % TMSP repeat units and 87 wt % 1-phenylbutyne repeat units are $O_2$, 200 barrer; $N_2$, 49 barrer; $CH_4$, 100 barrer; $H_2$, 670 barrer; and $CO_2$, 900 barrer. These permeabilities correspond to selectivities of $O_2/N_2$, 4.1; and $CO_2/CH_4$, 8.8 Annealed membranes made from these copolymers have even higher selectivities. The gas permeability of the same membranes annealed were $O_2$, 64 barrer; $N_2$, 10 barrer; $CH_4$, 21 barrer; $H_2$ 315 barrer; and $CO_2$, 295 barrer. These permeabilities correspond to selectivities of $O_2/N_2$, 6.1; and $CO_2/CH_4$, 14. The selectivities of both nonannealed and annealed membranes are much higher than those reported for the structurally similar copolymers composed of 1-phenylpropyne and TMSP reported by Hamano et al. in 26 *J. App. Plym. Sci: Part A: Polymer Chemistry* 2601 (1988). Such high selectivities are also accompanied by exceptionally high oxygen permeability. This exceptional performance is apparently due to the combination of having (1) a larger alkyl group unit, and (3) a trimethylsilyl group on the other repeat unit.

EXAMPLE 1

The following describes the synthesis of 13/87 wt % copolymer of poly(1-trimethylsilyl-propyne/1-phenyl-1-butyne [poly (TMSP/PB)].

In a nitrogen-filled dry box, a single neck round bottom flask with a 24/40 standard taper ground glass joint equipped with a magnetic stir bar was charged with 350 ml of anhydrous toluene; 1.82 g (6.7 mmol) of $NbCl_5$; and 3.20 g (7.3 mmol) of TPB. The flask was then sealed with a rubber septum which was clamped tightly in place. The flask was placed in a hot oil bath at 80° C. for one hour with stirring. During this catalyst curing, the mixture became dark and heterogeneous. In the nitrogen-filled dry box, 16 g (123 mmol) anhydrous 1-phenyl-1-butyne and 4.01 g (36 mmol) anhydrous TMSP were mixed in a 50 ml Erlenmeyer flask and sealed with a rubber septum. The mixture of acetylenes was injected into the catalyst solution by syringe while maintaining stirring at 80° C. The mixture became dark red to purple and viscous within 20 minutes.

After 4.5 hours from the injection of the acetylenes, the flask was removed from the oil bath and was opened to the air. The mixture was poured into one liter of toluene after which 50 ml of methanol was added to quench the catalyst. The mixture was stirred overnight at room temperature and then diluted with 2.5 L of acetone with vigorous stirring, which resulted in a white precipitate. The precipitated polymer was collected by filtration, rinsed with 300 ml acetone, and suction-dried, then dissolved in 1.0 L of tetrahydrofuran, filtered through a 0.22 μm filter to remove insoluble impurities, then precipitated with 2.5 L of acetone, collected by filtration, rinsed with 300 ml acetone, and dried in vacuo. The yield was 12.5 g, amounting to 78% of theoretical. Elemental analysis showed the presence of 3.17% silicon, and 86.94% carbon, which is consistent with a copolymer consisting of 13 wt % TMSP and 87 wt % PB repeat units.

The polymer obtained was analyzed using gel-permeation chromatography (GPC). A sample of a dilute solution of the copolymer in toluene was injected on a Hewlett Packard Model HP-1090 liquid chromatograph fitted with a Perkin Elmer PL gel 10-μm mixed 0258-2136 column. The sample was eluted with tetrahydrofuran at 1 ml/min, with the toluene solvent acting as an internal standard. The chromatogram obtained was consistent with the existence of a true copolymer. A final piece of evidence that the polymeric material made in Example 1 was a true copolymer was obtained by stirring the material in a solvent known to dissolve PTMSP; none of the polymeric material dissolved, indicating that the TMSP in the material was indeed copolymerized with PB and was not simply present as a separate homopolymer.

EXAMPLES 2–5

Various other copolymers of the present invention may be prepared using substantially the same protocol as in Example 1, using the amounts of monomers noted, to yield copolymers having the make-up in wt % noted below.

| Ex. 2: | 20/30 poly(TMSP/1-phenyl-1-pentyne) |
|---|---|
| | 14.6 g (10 mmol) 1-phenyl-1-pentyne |
| | 5.4 g (48 mmol) TMSP |
| Ex 3: | 20/80 poly(TMSP/1-(3-methylphenyl)-1-butyne) |
| | 14.6 g (101 mmol) 1-(3-methylphenyl)-1-butyne |
| | 5.4 g (48 mmol) TMSP |
| Ex 4: | 20/80 poly(TMSP/PB) |
| | 14.6 g (112 mmol) PB |
| | 5.4 g (43 mmol) TMSP |
| Ex 5: | 13/87 poly(1-triethylsilyl-propyne/PB) |
| | 14.6 g (123 mmol) PB |
| | 5.4 g (36 mmol) 1-triethyl-silylpropyne |

EXAMPLE 6

Ten grams of the copolymer of Example 1 was dissolved in 127 g toluene by stirring. The resulting 7.3 wt % solution was then passed through an 0.1-μm poly(tetrafluoroethylene) filter. The filtered solution was then centrifuged at 17,000 rpm for 20 minutes, then immediately cast onto 4 dust-free glass plates in a laminar-flow, dust-free fume hood using a doctor blade with a blade gap of 15 mil. The solvent was allowed to evaporate from the cast films by leaving them in the fume hood for 5 and ½ hours, producing four tack-free polymeric membranes in sheet form. The membrane sheets were removed from the glass plates by immersion in a cold water bath, and were observed to be transparent with a faint yellow color. The membrane sheets were then placed in a vacuum chamber at 25° C. for 15 hours. The thickness of the membranes was then measured to be 0.7 to 0.9 mil.

EXAMPLES 7–12

Six disks were cut from the membrane sheets fabricated in Example 6, each 1⅝ inches in diameter. The disks were mounted onto microporous polysulfone backings using adhesive tape and then mounted into gas permeation cells. The exposed membrane area of each disk was 7.92 cm². Each membrane was sequentially contacted with pure $O_2$, $N_2$, $CH_4$, $H_2$, and $CH_4$ at a pressure of 50 psig. (Hydrogen was tested at 35 psig, with the flow corrected by a factor of 5/3.5.) The flow of gas from the permeate port (held at 0 psig) was measured with a volumetric flow meter, and was corrected to STP using the ideal gas law equation. Gas flows were measured at least three times for each gas and membrane combination. The average gas flows, measured membrane thicknesses and calculated permeabilities and selectivities are reported in Table 1 below.

EXAMPLES 13–19

Remaining membrane sheets from which disks were removed in Examples 7–12 were annealed by placing in a vacuum oven at 80°±5° C. under argon for 15 hours. The sheets were removed and seven disks were cut, mounted and tested as above. The average gas flows, measured membrane thicknesses and calculated permeabilities and selectivities are reported in Table 2 below.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

TABLE 1

| Ex. No. | Thickness (mils) | Gas Flow (ml/min) | | | | | Selectivity | | | | | Permeability (barriers) | | | | |
|---|---|---|---|---|---|---|---|---|---|---|---|---|---|---|---|---|
| | | $O_2$ | $N_2$ | $CH_4$ | $H_2$ | $CO_2$ | $O_2/N_2$ | $CH_4/N_2$ | $H_2/CH_4$ | $CO_2/CH_4$ | $CO_2/H_2$ | $O_2$ | $N_2$ | $CH_4$ | $H_2$ | $CO_2$ |
| 7 | 0.80 | 1.33 | 0.32 | 0.69 | 4.66 | 6.04 | 4.1 | 2.1 | 6.7 | 8.8 | 1.3 | 198 | 48 | 103 | 693 | 899 |
| 8 | 0.75 | 1.38 | 0.34 | 0.70 | 4.87 | 6.68 | 4.1 | 2.1 | 7.0 | 9.6 | 1.4 | 193 | 47 | 97 | 680 | 932 |
| 9 | 0.70 | 1.59 | 0.30 | 0.62 | 4.29 | — | 5.3 | 2.1 | 6.9 | — | — | 207 | 39 | 80 | 558 | — |
| 10 | 0.75 | 1.53 | 0.45 | 0.81 | 5.31 | 7.63 | 3.4 | 1.8 | 6.6 | 9.4 | 1.4 | 213 | 62 | 113 | 741 | 1064 |
| 11 | 0.90 | 1.34 | 0.36 | 0.65 | 4.64 | 6.23 | 3.7 | 1.8 | 7.2 | 9.6 | 1.3 | 224 | 60 | 108 | 777 | 1043 |
| 12 | 0.70 | 1.43 | 0.39 | 0.85 | 4.77 | 7.11 | 3.6 | 2.1 | 5.6 | 8.4 | 1.5 | 186 | 51 | 110 | 621 | 926 |

TABLE 2

| Ex. No. | Thickness (mils) | Gas Flow (ml/min) | | | | | Selectivity | | | | | Permeability (barriers) | | | | |
|---|---|---|---|---|---|---|---|---|---|---|---|---|---|---|---|---|
| | | $O_2$ | $N_2$ | $CH_4$ | $H_2$ | $CO_2$ | $O_2/N_2$ | $CH_4/N_2$ | $H_2/CH_4$ | $CO_2/CH_4$ | $CO_2/H_2$ | $O_2$ | $N_2$ | $CH_4$ | $H_2$ | $CO_2$ |
| 13 | 0.85 | 0.45 | 0.085 | 0.21 | 1.70 | 2.23 | 5.3 | 2.4 | 8.3 | 10.9 | 1.3 | 71 | 13 | 32 | 269 | 353 |
| 14 | 0.95 | 0.43 | 0.073 | 0.16 | 2.26 | 2.05 | 5.9 | 2.2 | 14.1 | 12.8 | 0.9 | 76 | 13 | 28 | 399 | 362 |
| 15 | 0.75 | 0.43 | 0.073 | 0.15 | 2.24 | 2.09 | 5.9 | 2.1 | 14.9 | 13.8 | 0.9 | 60 | 10 | 21 | 313 | 292 |
| 16 | 0.80 | 0.43 | 0.069 | 0.14 | 2.10 | 1.98 | 6.2 | 2.1 | 14.7 | 13.8 | 0.9 | 64 | 10 | 21 | 312 | 295 |
| 17 | 0.70 | 0.49 | 0.100 | 0.18 | 2.36 | 2.42 | 4.9 | 1.8 | 13.5 | 13.8 | 1.0 | 63 | 13 | 23 | 307 | 315 |
| 18 | 0.80 | 0.48 | 0.087 | 0.17 | 2.33 | 2.40 | 5.5 | 2.0 | 13.7 | 14.1 | 1.0 | 71 | 13 | 25 | 347 | 357 |
| 19 | 0.75 | 0.46 | 0.094 | 0.16 | 2.43 | 2.35 | 4.9 | 1.7 | 15.3 | 14.8 | 1.0 | 65 | 13 | 22 | 339 | 328 |

What is claimed is:

1. A polymeric membrane comprising a copolymer of an aryl-substituted acetylic monomer of Structure I and a bulky group-substituted acetylic monomer of Structure II, wherein Structures I and II are defined as follows:

Structure I

A—C≡C—R where A is selected from phenyl and phenyl substituted with at least one substituent selected from the group consisting of methyl, ethyl, halogen, —$CF_3$ and —$CF_2CF_3$, and R is selected from ethyl, n-propyl and isopropyl;

Structure II

B—C≡C—R' where B is —$Si(R')_3$, and R' is an alkyl group having from 1 to 3 carbon atoms.

2. The membrane of claim 1 wherein the polymerized form of Structure I is present in an approximate amount of from 20 to 95 wt % and the polymerized form of Structure II is present in an approximate amount of from 5 to 80 wt %.

3. The membrane of claim 1 wherein B is —$Si(CH_3)_3$.

4. The membrane of claim 1 wherein R is ethyl.

5. The membrane of claim 4 wherein B is —$Si(CH_3)_3$.

6. The membrane of claim 5 wherein R' is selected from methyl and ethyl.

7. The membrane of claim 1 wherein A is phenyl, R is ethyl, B is —$Si(CH_3)_3$ and R' is selected from methyl and ethyl.

* * * * *

UNITED STATES PATENT AND TRADEMARK OFFICE
CERTIFICATE OF CORRECTION

PATENT NO. : 5,494,989

DATED : February 27, 1996

INVENTOR(S) : Warren K. Miller and Dwayne T. Friesen

It is certified that error appears in the above-indentified patent and that said Letters Patent is hereby corrected as shown below:

Col. 2, line 26: move the (1) before "A—X≡C—R'"

Col. 2, line 29: remove the (2) at the right margin

Col. 5, line 49: add a closed parentheses ()) after "pentyne"

Col. 5, line 43: add a closed parentheses ()) after "butyne"

Col. 5, line 59: add a closed parentheses ()) after "propyne/PB --

Signed and Sealed this

Twenty-second Day of October, 1996

BRUCE LEHMAN

Attest:

Attesting Officer

Commissioner of Patents and Trademarks